S. J. PATTON.
BOLL WEEVIL DESTROYER.
APPLICATION FILED JAN. 17, 1917.
1,241,012.
Patented Sept. 25, 1917.
3 SHEETS—SHEET 2.
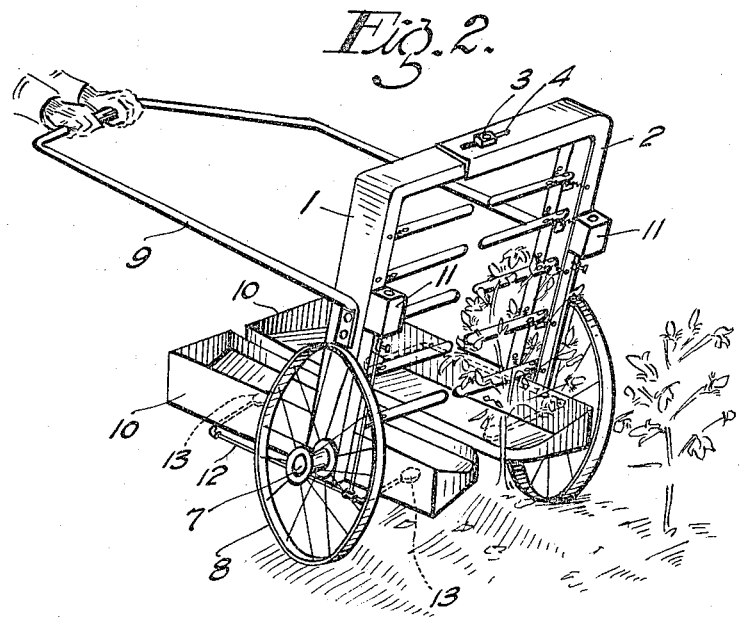
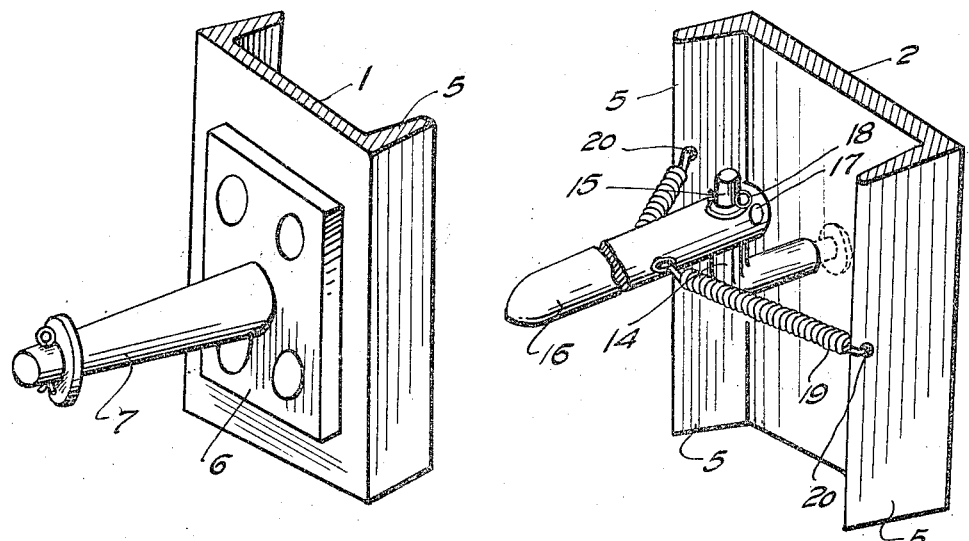

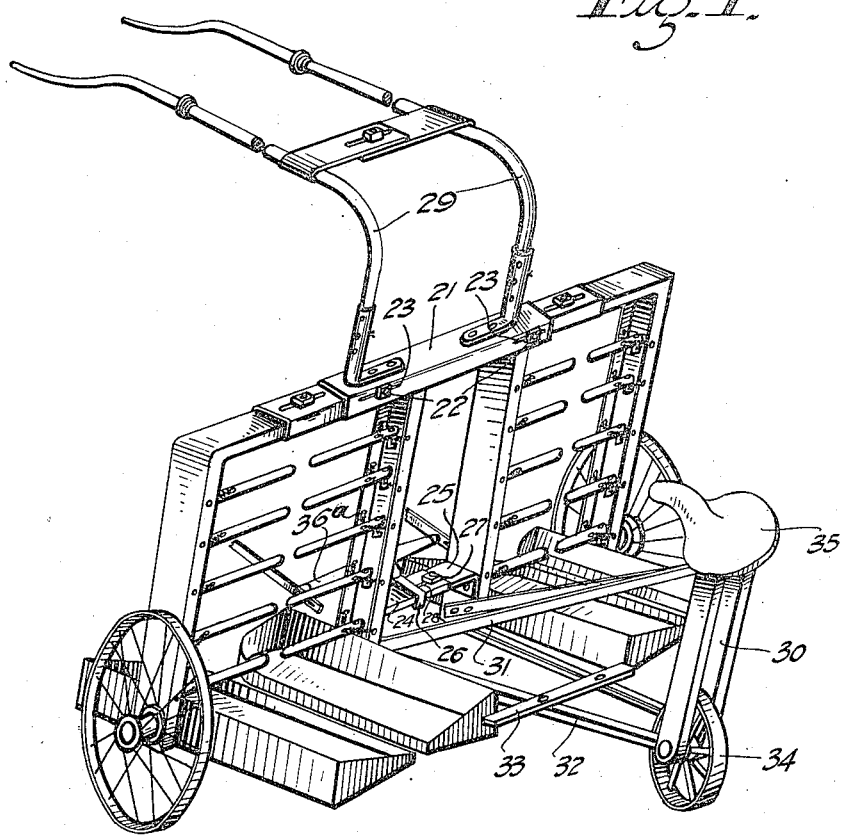

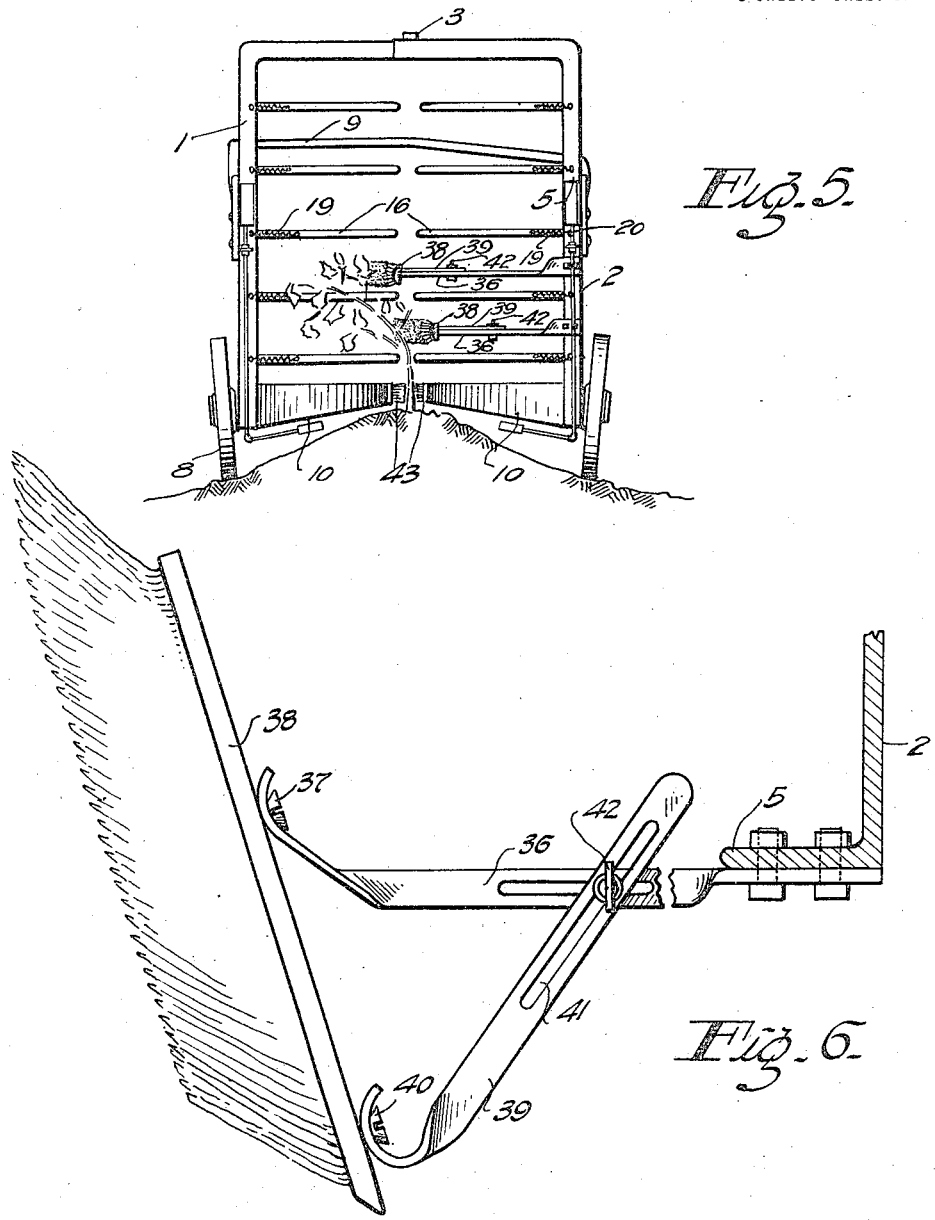

UNITED STATES PATENT OFFICE.

SAMUEL J. PATTON, OF HELENA, ALABAMA.

BOLL-WEEVIL DESTROYER.

1,241,012.  Specification of Letters Patent.  Patented Sept. 25, 1917.

Application filed January 17, 1917. Serial No. 142,916.

*To all whom it may concern:*

Be it known that I, SAMUEL J. PATTON, a citizen of the United States of America, residing at Helena, in the county of Shelby and State of Alabama, have invented certain new and useful Improvements in Boll-Weevil Destroyers, of which the following is a specification.

My invention relates to a device adapted for capturing and destroying boll weevils and like insects which injure or destroy plants.

It is my purpose to design an apparatus which is simple, rugged and readily adapted for being pushed or drawn through the field by hand or team.

One characteristic feature of my invention is the provision of a frame formed by a single arch of channel plates with the flanges inturned and having pivoted shaker rods mounted in the groove of the channel with springs attached to the channel flanges and to the rods for holding them yieldingly in plant engaging position, there being pans to catch and destroy the insects as they fall from the plant.

Another distinctive feature of my invention is the arrangement of brushes set in advance of the shaker rods and adapted to bend or lean the plants over the pan or pans before the rods engage it. The advantage of this is that the plants are deflected over the pans before the shaking elements of the frame cause the insects to fall therefrom. In order to protect the plants as much as possible, I use brushes for bending them and I protect the stalks against injury from the pan by providing a brush along the pan edge, the fibers of both brushes being rearwardly inclined so as to afford a very yielding surface to the plant.

As illustrative of my invention, reference is made to the accompanying drawings, in which:—

Figure 1 shows the sulky type of apparatus which is adapted to work two rows at a time.

In Fig. 2 I show the same apparatus modified to be pushed by hand.

Figs. 3 and 4 are detail views of the wheel bearing and the mounting for one of the shaker rods.

Fig. 5 is a front view of Fig. 2 equipped with bending brushes; and

Fig. 6 is a detail view of one of the brushes and its adjustable mounting shown in plan.

Similar reference numerals refer to similar parts throughout the drawings.

As the apparatus shown in Fig. 1 is to a large extent a duplicate of that shown in Fig. 2, the latter will be first described. Here the frame is shown formed of a pair of channel bars 1 and 2, the channel bar 2 being sufficiently wider than 1 so that it will overlap the latter. The ends of the bars are bent at right angles and the lapped portions of the bars are connected by a bolt 3 working through an elongated adjustment slot 4 in the upper bar and serving to unite them into a U-shaped frame which is adjustable as to width. The flanges 5 of the channels are inturned and near the lower ends of the frame I rivet bearing plates 6 which carry axles 7 for the wheels 8. A bent handle bar 9 is riveted to the sides of the frame and a pair of pans 10 are attached to the lower portions of the frame and set so as to receive and permit the stems of the plants to pass freely between them. As shown, the pans are deepened toward their outer side edges and they are filled with tar, pitch or any suitable insect destroying substance. When tar or pitch is used it is necessary to keep it sufficiently warm in cold weather so that the insect will become embeddel or besmirched therewith, and to this end I provide a fuel tank 11 on each side of the frame and connect the same by pipes 12 to burners 13 under the pans.

I rivet through the channels a series of angled bearing studs 14 having their outer ends upturned and reduced at 15 to form a shouldered bearing for the shaker rods 16 which are free to turn horizontally thereon, being held in place by washers 17 and cotter keys 18. Coiled springs 19 connect to an intermediate portion of the rod and project in opposite directions toward and have their ends made fast in holes 20 in the flanges 5 of the adjacent channel. These rods overhang the pans and the forward edges of the latter are rounded to form a flaring throat which will guide the plants between them without damage.

In Fig. 1 I show two frames constructed in the manner described and adjustably fastened overhead by a channel 21 and bolts 22 passing through slots 23 in the channel and engaging the frame. The frames at their lower ends are connected by two lapped bars 24 and 25, one carrying a loop 26 and a bolt 27 and the other having an elongated slot 28 for the bolt. Shafts 29 are connected to the top plate 21 and a sulky frame comprising uprights 30 and brace bars 31 and 32 is connected to the lower portions of the frame and has a cross brace 33 connecting the bars 32 and forming a foot rest. A wheel 34 is journaled in the sulky frame which carries a driver's seat 35.

When the plant is young it is desirable to deflect it over a pan before it strikes the rods and to this end, as shown in Fig. 5, I attach or bolt to the flange 5 of the channel 2, a bent metal bar 36 having its outer end twisted to a vertical plane and connected by a screw 37 to the back of a brush 38. An adjusting bar 39 is connected by a screw 40 to the forward end of the brush and has an elongated slot 41 therethrough through which a bolt 42 on the bar 36 works. By this arrangement the angle of the brush can be readily adjusted and I preferably employ two of these brushes, one above the other and one set at a greater angle than the other so that they will gradually bend the plant over, as seen more clearly in Fig. 5. It will be apparent that when the brushes are used, the pan away from which the plant is bent might be dispensed with. To protect the stem of the plant from injury by being pressed against the pan, I mount along the inner edges of the latter a brush 43 having its bristles inclined rearwardly, thus affording a soft yielding surface which will protect the plant stalks.

In practice, the apparatus is drawn along the row of plants, the shaker rods, or brushes and shaker rods engage the plant and cause the weevil or bug to fall therefrom into the pan or pans where he is caught and destroyed by the substance therein. When tar or pitch is used and the weather is cold enough to harden the latter, the burners may be ignited and will keep the tar soft.

The whiffle tree 36ª is preferably connected to the loop 26 on the bottom brace 24, 25, but the shafts are connected high on the frame to avoid contact with the plants.

When the brushes are used, the shaker rods may be dispensed with, especially when working young and tender cotton plants. The spring means employed should hold the rods in normal plant engaging position, permitting the rods to yield freely and drag through the plant without damage and as each limb releases a rod it springs with a light tapping stroke against another limb or stalk of the plant, thereby effectually shaking off the insects without damage to the plant.

The simplicity and lightness of the single, narrow inverted U-frame with the wheels and pans connected at its base and the shaker elements up along its sides, renders my apparatus both cheap and very durable, and the adjustments provided make it available for a large variety of plants.

Having thus described my invention, what I claim as new and desire to secure by Letters Patent, is:—

1. An insect destroying apparatus comprising a wheel supported frame, vertical bearings connected to the upright sides of the frame, shaker rods journaled to swing horizontally on said bearings, coil springs connecting the intermediate portions of the rods on opposite sides to the frame, and means to catch the insects as they are shaken from the plant, substantially as described.

2. In an insect destroying apparatus, a wheel supported frame comprising relatively adjustable angular frames formed of channels, one channel being adapted to overlap the other where they connect overhead, an adjustable connection for said lapping portions, angled bearing studs made fast in the inturned channel faces, shaker rods pivoted to swing horizontally on said bearings, coiled springs connected to the side flanges of the channel and to the sides of the rods for holding the latter in central position, and means to catch the insects as they are shaken from the plant.

3. In an insect destroying apparatus, a wheeled frame comprising two channel bars with the channels inturned and their upper ends bent at right angles and lapped, an adjustable connection for the lapped ends of the channels, wheels journaled to the lower ends of the frame, pans also connected to the frame and spaced to permit the plant stem to pass between them, yieldable plant engaging members pivoted to the channels, and horizontally adjustable deflectors adjustably mounted on the frame and having their plant engaging surfaces covered with rearwardly inclined bristles, substantially as described.

4. In an insect destroying apparatus, a wheeled frame comprising two channel bars with the channels inturned and their upper ends bent at right angles and lapped, an adjustable connection for the lapped ends of the channels, wheels journaled to the lower end of the frame, pans also connected to the frame and spaced to permit the plant stem to pass between them, yieldable plant engaging members pivoted to the channels, horizontally adjustable deflectors adjustably mounted on the frame and having their plant engaging surfaces covered with rearwardly inclined bristles, and rearwardly inclined bristles on the plant engaging edge of the pan.

5. In an insect destroying apparatus, a wheeled frame, a pan carried thereby in position to travel under the plant, means on the frame to knock the insects on the plant into the pan, and a fuel burner under the pan to keep its bottom heated.

6. In an insect destroying apparatus, an inverted U-shaped frame formed of a narrow strip of material and constituting the super-structure of the apparatus, wheels mounted at the lower ends of the frame sides, pans mounted between the frame sides, plant shaking rods pivoted to the sides of the frame and adapted to swing horizontally, spring means to yieldingly hold the rods in normal plant engaging position, and means for guiding the movements of the frame.

In testimony whereof I affix my signature.

SAMUEL J. PATTON.

Witness:
NOMIE WELSH.

Copies of this patent may be obtained for five cents each, by addressing the "Commissioner of Patents, Washington, D. C."